(12) United States Patent
Cohen

(10) Patent No.: US 7,792,814 B2
(45) Date of Patent: Sep. 7, 2010

(54) APPARATUS AND METHOD FOR PARSING UNSTRUCTURED DATA

(75) Inventor: Ronen Cohen, Nahariya (IL)

(73) Assignee: SAP, AG, Waldorf (DE)

( * ) Notice: Subject to any disclaimer, the term of this patent is extended or adjusted under 35 U.S.C. 154(b) by 1041 days.

(21) Appl. No.: 11/240,810

(22) Filed: Sep. 30, 2005

(65) Prior Publication Data

US 2007/0078872 A1 Apr. 5, 2007

(51) Int. Cl.
*G06F 7/00* (2006.01)
*G06F 17/30* (2006.01)

(52) U.S. Cl. .................. 707/707; 707/708
(58) Field of Classification Search .......... 707/4, 707/100, 101, 102; 717/14; 705/34; 345/169; 348/143; 340/870.13
See application file for complete search history.

(56) References Cited

U.S. PATENT DOCUMENTS

| | | | | |
|---|---|---|---|---|
| 2004/0093331 A1* | 5/2004 | Garner et al. | .................. | 707/3 |
| 2005/0055389 A1* | 3/2005 | Ramanujam | ................ | 708/204 |
| 2005/0096980 A1* | 5/2005 | Koningstein | .................. | 705/14 |
| 2005/0275736 A1* | 12/2005 | Chiu et al. | .................. | 348/272 |

\* cited by examiner

*Primary Examiner*—Charles Rones
*Assistant Examiner*—Fariborz Khoshnoodi
(74) *Attorney, Agent, or Firm*—Cotman IP Law Group, PLC

(57) ABSTRACT

A user interface for parsing unstructured data using pattern recognition. The patterns used in parsing data are formed from regular expressions. The parsed data may be displayed in a first format and unmatched strings in the unstructured text may be displayed in a second format. A format may comprise a desired color, font or any other user interface parameter. In addition, the data that parses according to a pattern may be placed in a column associated with the pattern in a tabular user interface, for example a spreadsheet like Excel™. Associating a pattern with a position to display successful matches in allows for breaking unstructured text into pieces associated with a particular field or column. Modification of the patterns allows for more and more of the unstructured text to match the patterns and when the data has been parsed to the desired level, the data may be imported into a database.

12 Claims, 6 Drawing Sheets

Figure 1

| | A | B | C | D | E |
|---|---|---|---|---|---|
| 1 | Manufacturer Name | Manufacturer Address | PO Box | Street | Unmatched Text |
| 2 | Elvex Corporation | P.O. Box 650, Bethel | P.O. Box 650 | | , Bethel |
| 3 | J.P. Nilssen Company | 2544 Fairhill Avenue, P.O. Box 339, Glenside | P.O. Box 339 | 2544 Fairhill Ave | nue, , Glenside |
| 4 | Gearench | P.O. Box 192, Clifton | P.O. Box 192 | | , Clifton |
| 5 | Elk River, Inc. | PO Box 1770, Cullman | PO Box 1770 | | , Cullman |
| 6 | Advance Milwaukee Brush Mfg. Co. | W142 N9251 Fountain Blvd., P.O. Box 830, Menomonee Falls | P.O. Box 830 | W142 N9251 Fountain Blvd | , , Menomonee Falls |
| 7 | Leeson Electric Corporation | 2100 Washington Street, P.O. Box 241, Grafton | P.O. Box 241 | 2100 Washington Street | , , Grafton |
| 8 | Balex Inc. | P.O. Box 95, North Lake | P.O. Box 95 | | , North Lake |
| 9 | Band-It-IDEX, Inc. | P.O. Box 16307, 4799 Dahlia St., Denver | P.O. Box 16307 | 4799 Dahlia St., Denver | |
| 10 | National-Spencer, Inc. | P.O. Box 57, Wichita | P.O. Box 57 | | , Wichita |
| 11 | Balco Inc. | 2626 S. Sheridan, P.O. Box 17249, Wichita | P.O. Box 17249 | | 2626 S. Sheridan, , Wichita |
| 12 | Diamond Chain Company | 402 Kentucky Avenue, PO Box 7045, Indianapolis | PO Box 7045 | 402 Kentucky Ave | nue, , Indianapolis |
| 13 | Best Access Systems | 6161 East 75th Street, PO Box 50019, Indianapolis | PO Box 50444 | 6161 East 75th Street | , Indianapolis |
| 14 | Relton Corporation | 317 Rolyn Place, P. O. Box 50019, Arcadia | P.O. Box 50019 | 317 Rolyn Place | , , Arcadia |
| 15 | Pacific Grinding Wheel Co., Inc. | P.O. Box 468, Marysville | P.O. Box 468 | | , Marysville |
| 16 | J&M Diamond Tool, Inc. | 43 Roger Williams Ave. P.O. Box18099, E. Providence | P.O. Box16099 | 43 Roger Williams Ave | , , E. Providence |
| 17 | Lewis Manufacturing Company | 3601 S. Byers, P.O. Box 95089, Oklahoma City | P.O. Box 95089 | 3601 S. Byers, , Oklahoma City | |
| 18 | Gleason Wheel Division | P.O. Box 343, 316 N. Milwaukee Street, Milwaukee | P.O. Box 343 | 316 N. Milwauk | ee, Milwaukee |
| 19 | Gleason Caster Division | P.O. Box 343, 316 N. Milwaukee Street, Milwaukee | P.O. Box 343 | 316 N. Milwauk | ee, , Milwaukee, |
| 20 | Milwaukee Hand Trucks | P.O. Box 343, 316 N. Milwaukee | P.O. Box 343 | | 316 N. Milwaukee |
| 21 | Mayes Brothers Tool Mfg. Co. | Clairmont Road, P.O. Box 1018, Johnson City | P.O. Box 1018 | Clairmont Road | , Johnson City |
| 22 | Phillips Lighting Company | 22100 Bothell Everett Highway, P.O. Box 3003, Bothell | P.O. Box 3003 | 22100 Bothell Everett Highway | , , Bothell |
| 23 | Meter-Man, Inc. | 2 South Main, P.O. Box 746, Winnebago | P.O. Box 746 | 2 South Main | , Winnebago |
| 24 | Lowell Corporation | P.O. Box 158, Worcester | P.O. Box 158 | | , Worcester |
| 25 | Oberon Company | PO Box 61008, New Bedford | PO Box 61008 | | , New Bedford |
| 26 | Hannibal Carbide Tool, Inc. | P.O. Box 954, Hannibal | P.O. Box 954 | | , Hannibal |
| 27 | Punch-Lok Inc. | PT Coupling, Inc., P.O. Box 3909, 1414 East Willow, Enid | | | |
| 28 | PT Coupling Company, Inc. | P.O. Box 3909, 1414 East Willow, Enid | | | |
| 29 | OK-1 Safety & Ergonomics | 709 South Veterans Drive, P.O. Box 736, Altus | | | |
| 30 | Chapin Manufacturing, Inc. | 700 Ellicott St., PO Box 549, Batavia | | | |

Figure 2

B2    ƒ×    .*(Ave|Street|blvd|Road|Dr\.|Main,|Rd\.|Parkway|Drive|Place)

| | A | B | C | D | E | F |
|---|---|---|---|---|---|---|
| 1 | Include | Pattern | Name | Pos | Make | Synonym |
| 2 | 1 | .*(Ave|Street|blvd|Road|Dr\.|Main,|Rd\.|Parkway|Drive|Place) | Street | 1 | 2 | |
| 3 | 1 | P\.?\s?O\.?\s?\s?B(ox)?\s?\d* | PO Box | 1 | | |
| 4 | 0 | ("(?<=www\s*=\s*[""']).*?(?=[""'])") | URL | 1 | | |
| 5 | 0 | http:\/\/www\.([\w]+\.)+[\w]+(/([\w.?%&=])?)? | URL | 1 | | |
| 6 | 0 | Saddle Brook | City | 1 | | |
| 7 | 0 | Bridgeport | City | 1 | | |
| 8 | 0 | Ridgefield | City | 1 | | |
| 9 | 0 | Bethel | City | 1 | | |
| 10 | 0 | South Norwalk | City | 1 | | |
| 11 | 0 | | City | 1 | | |

200

201 — Include column
202 — Pattern column
203 — Name column
204 — Pos/Make columns

APPARATUS AND METHOD FOR PARSING UNSTRUCTURED DATA

BACKGROUND OF THE INVENTION

1. Field of the Invention

Embodiments of the invention described herein pertain to the field of computer system user interfaces. More particularly, but not by way of limitation, one or more embodiments of the invention enable a user interface for parsing unstructured data using pattern recognition wherein parsed data is displayed in a first format and unparsed data is displayed in a second format.

2. Description of the Related Art

There are a number of requirements and/or preferences associated with utilizing unstructured data. Data may be received in a variety of formats that may or may not originate from a common source. When data is obtained from different sources that has no common structure or format, it must be normalized so that the data may be utilized.

Current tabular user interface oriented programs provide cumbersome wizard based solutions that do not allow for easily converting unstructured text into structured substrings that matches desired patterns. Microsoft Excel™ is an example of such a program. There are no solutions for using predefined pattern libraries that allow formatting to be applied to matching text and non-matching text and for example a matching string to be placed in a separate column while color coding text that fails to match one or more patterns.

Existing solutions allow for legacy file formats to be read, however these legacy formats are generally delimited by special characters or exist in fixed width fields. These file formats are generally related to EDI and the archaic method of defining custom files for intercompany communications before the advent of XML. These file formats are generally specific to a particular customer and reading in multiple files from multiple customers that all use different formats to represent the same type of data defeats these types of solutions.

U.S. Pat. No. 6,668,254 to Matson et al., relates to a method and system for importing data comprising the downloading of product data from different sources and in different formats; processing the downloaded data by at least comparing it with data downloaded and stored in a product database; and reviewing the results of the comparison to detect differences in the data, the differences potentially being errors. The system and methods further comprise [converting] the downloaded data from its supplier specific format into a standard format; comparing the downloaded data in the standard format with a previously downloaded data set saved in the standard format; categorizing the product data based on the results of the second comparison; and processing each category of data independently to automatically update the product database.

Specifically, "as an alternative or in addition to simple differential analysis, the data load technician can use many other tools to gain insight into the contents of the latest supplier data file. In fact, the input data should be subjected to significant review before proceeding with the import process, especially for data from new or unreliable suppliers. These tools include, but are not limited to, viewing the file in a text editor, loading relational data into a database such as Oracle and executing various retrievals, and analyzing the data in an Excel spreadsheet."

U.S. Pat. No. 6,718,336 to Saffer describes a data import system that enables access to data of multiple types from multiple data sources of different formats and provides an interface for importing data into a data analysis system. The interface enables a user to customize the formatting of the data as the data is being imported into a data analysis system.

Specifically, "If the user selects the define format option, a format editor is presented for the user to define the format of the structured text. If the user selects the unstructured text option (FIG. 9e), the user is presented with options for identifying the unstructured text."

U.S. Patent Application Publication 2005060324 to Johnson et al., describes a "System and method for creation and maintenance of a rich content or content-centric electronic catalog". The system and method disclosed are directed toward transforming catalog data from multiple supplier sources to a standardized rich content catalog either by the suppliers themselves or by a third party using the system and method of the present invention. Incoming raw catalog data content is cleansed and normalized using an extensive knowledge base of patterns and incoming schemas are appended to the cleansed and normalized data. The resulting rich content catalogs are published for user browsing and data syndication.

Specifically, "the underlying framework for the invention is based on an extensive and extensible knowledge base of over 200,00[0] patterns covering an extremely broad range of 44,000 families of goods and services. This knowledge base can be used to load any database (e.g., Oracle, Sybase, DB2, Access, etc) or any spreadsheet (e.g., Excel), as well as to output XML, EDI, or any other standard format."

U.S. Patent Application Publication 20030182287 to Parlanti et al., describes an "interface for an electronic spreadsheet and a database management system". The invention is directed to a generalized interface for an Electronic Spreadsheet program, such as Microsoft Excel, and any data provider supported from Microsoft Universal Data Access (UDA), such as an Open Database Connectivity driver (ODBC), for a Database Management System (DBMS) such as DB2/400.

Specifically, "The interface reads a profile file (.ini) and interprets the instructions in this file to add commands to the Excel Menu bar. This profile file also contains instructions on the sequence of SQL statements to be performed for each Command added and embedded these in the SQL database."

U.S. Patent Application Publication 20030061226 to Bowman et al., describes a "data loader for handling imperfect data and supporting multiple servers and data sources". A "wizard-based" data loader handles imperfect data and supports multiple servers and data sources. The structures that represent the hierarchical model for the data are defined and created as the backbone for the model using spreadsheets, multiple relational database tables, and other sources of data that may reside on one or more servers.

Specifically, "the wizard-based data loader is a tool that permits ordinary business or domain experts to create templates that load data from existing sources of data that are both internal and external to an organization. The data loading mechanism provides three fundamental capabilities: the creation of structural hierarchies, the loading of information into those hierarchies, and the linking of data across hierarchies. The automated data loader allows the user to automate data loads so that data loading tasks can be scheduled to run automatically at a regular intervals and scheduled times."

U.S. Patent Application Publication 2002004835 to Pepin et al., describes a "method and apparatus for enabling bulk loading of data". A system and method for processing information performs actions associated with rules to modify, adjust, calculate and massage data to comport with downstream handling requirements. In one example, bulk uploads from a supplier are treated in accordance with column headings to perfect data to be imported into a marketplace. The system also permits the storage of the rules to process later uploads with similar data structures.

Specifically, "The Supplier User performs the inventory management function by selecting this application object. The user specifies the source of the inventory data, which can be in multiple formats (csv, excel, tab delimited, xml). The User identifies the source and the data is processed by the service."

The Adeptia Product comprises a data integration capability that includes support for complex data formats and transformation. The product comprises a data transformation engine that allows any-to-any mapping between different data formats. Complex data processing functions are included such as string, math, and conditional operations as well as DB and XML file look-up. Data can be aggregated from multiple sources. Supported data formats include XML-DTD, XSD, Hierarchical, attributes, enumerated values, ASCII Text/Flat, Fixed-length, EDI, AL3, Excel files, SQL compliant relational databases such as Oracle, Sybase, DB2, Informix, MySQL etc.

The Autonomy Product comprises technology that automatically reads, categorizes, hyperlinks, personalizes large volumes of unstructured data, and delivers personalized highly targeted content automatically.

The Stylus Studio Product allows for the generation of match patterns in importing EDI data. The product comprises a utility named Convert to XML. Convert to XML works on any legacy data input file, for example, text files, comma separated values (CSV), tab separated values, binary data, EDI files, or any other flat file format. Stylus Studio can also read dozens of different file encodings, understand various data types, and so on.

For at least the limitations described above there is a need for an apparatus and method for parsing unstructured data.

BRIEF SUMMARY OF THE INVENTION

One or more embodiments of the invention enable a user interface for parsing unstructured data using pattern recognition. The patterns used in parsing data are formed from regular expressions. The parsed data may be displayed in a first format and unmatched strings in the unstructured text may be displayed in a second format. A format may comprise a desired color, font or any other user interface parameter for example. In addition, the data that parses according to a pattern may be placed in a column associated with the pattern in a tabular user interface, for example a spreadsheet such as Excel™. By formatting data that successfully parses and displaying data that has not successfully parsed in a different format, the process of readying the data for import into a database is rapidly achieved.

A pattern is also known as a regular expression. A regular expression is an expression that represents a set of strings. For example, the set containing at least three strings apple, apply and application can be described by the pattern "appl[iey].*". The pattern may also be said to match each of the three strings. A set of characters in brackets matches any one of the characters inside the brackets. A period may match any character for example. A quantifier after a character or group specifies how often the preceding expression occurs. The most common quantifiers are ?, *, and +. The question mark indicates there may or may not be one of the previous expression. For example, "labou?r" matches both labor and labour. The asterisk indicates there may be zero or more of the previous expression. For example, "bog*le" matches bole, bogle, boggle, etc. The plus sign indicates that there must be at least 1 of the previous expression. For example, "bog+le" matches bogle, boggle, (but not bole).

The patterns may be created and modified using a tabular user interface. Any method of associating a pattern with a position to display text that matches the pattern is in keeping with the spirit of the invention. For example, by utilizing a spreadsheet row that comprises at least a regular expression and a position field, any unstructured text string that matches the pattern may be visually displayed in a position that is specified by the position field. This allows for multiple patterns to match a particular unstructured text string with the respective matching text for each pattern placed into a separate column within the spreadsheet. This enables the data to be molded into a format that is compatible with a database schema for example. Modification of the patterns allows for more and more of the unstructured text to match the patterns and subsequently eliminates more and more unmatched text. When the data has been parsed to the desired level, the data may be exported from the spreadsheet and imported into a database for example.

The patterns may be displayed in the tabular user interface as tooltips associated with each position or column where a pattern parses to. This allows for quick view of the regular expression that is being used to parse data for a particular position or column in the spreadsheet for example. By editing the patterns to match more and more of the unstructured text, or by adding new patterns for new fields and positions, the data may be recognized to the desired level.

Embodiments of the invention may comprise an "autofill" command that allows cells to be filled from existing selected cells. This feature allows for at least one cell to be copied into another at least one cell anywhere in the spreadsheet by accepting a user command to select at least one cell and accepting a user command to autofill into another selected at least one cell. This process may utilize the mouse or keyboard commands to accept user commands for example.

Embodiments of the invention may comprise a split-text command that parses unstructured text into columns based delimiters. This command aides in breaking down unstructured text into multiple rows for example based on a delimiter in the unstructured text such as a comma, or semi-colon or tab or any other character that is used in order to specify that text is delimited in some way.

Embodiments of the invention may use of popup menus in order to present commands available to the user. Embodiments of the invention may comprise a plug-in or add-in that is integrated with an existing tabular user interface such as a spreadsheet for example. The plug-in may add menus and popup menus to the user interface of the tabular user interface in order to augment the functionality provided by the program. This allows any supported tabular user interface to gain the functionality of one or more embodiments of the invention.

An embodiment of a method for parsing unstructured data comprises retrieving a row of unstructured data, retrieving a pattern and associated position for which to place data that matches the pattern, checking the unstructured text for a match on the pattern, formatting the successfully matching data which may comprise placing the data in a separate column according to the position, checking for more regular expressions to match and checking for more rows to match.

Unstructured data may be imported from a variety of sources. After the data has parsed to the desired level, the resulting normalized data may then be exported from the tabular user interface and imported into a database. An advantage of this solution is that it is not bound to specific business logic and may be utilized for data originating from and destined for varying verticals.

One or more embodiments of the invention enable an apparatus for parsing unstructured data comprising a computer and a computer readable medium coupled with said computer. The computer readable medium is configured to store computer-executable process steps configured for parsing and displaying results of parsing in a tabular user interface. Code is configured to obtain a row of unstructured data displayed as a plurality of unstructured text records in a column of a tabular user interface. The code is also configured to obtain a pattern to use in searching said row of unstructured data. The code is also configured to obtain format parameters for text that matches said pattern and for text that does not match said pattern. The code is also configured to search data comprising at least one unstructured text record selected from said plurality of unstructured text records for said pattern. The code is also configured to format a first text string in a first format wherein said first text string represents text that matches said pattern wherein said first text string is selected from said at least one unstructured text record. The code is also configured to format a second text string in a second format wherein said second text string represents text that does not match said pattern wherein said second text string is selected from said at least one unstructured text record. The code is also configured to check for more patterns. The code is also configured to check for more unstructured text records.

BRIEF DESCRIPTION OF THE DRAWINGS

The above and other aspects, features and advantages of the invention will be more apparent from the following more particular description thereof, presented in conjunction with the following drawings wherein:

FIG. 1 is a view of a tabular user interface comprising unstructured text and parsed data that matches at least one pattern.

FIG. 2 is a view of a tabular user interface comprising a set of patterns comprising associated positions for placing successful pattern matches.

DETAILED DESCRIPTION

Figure 3:
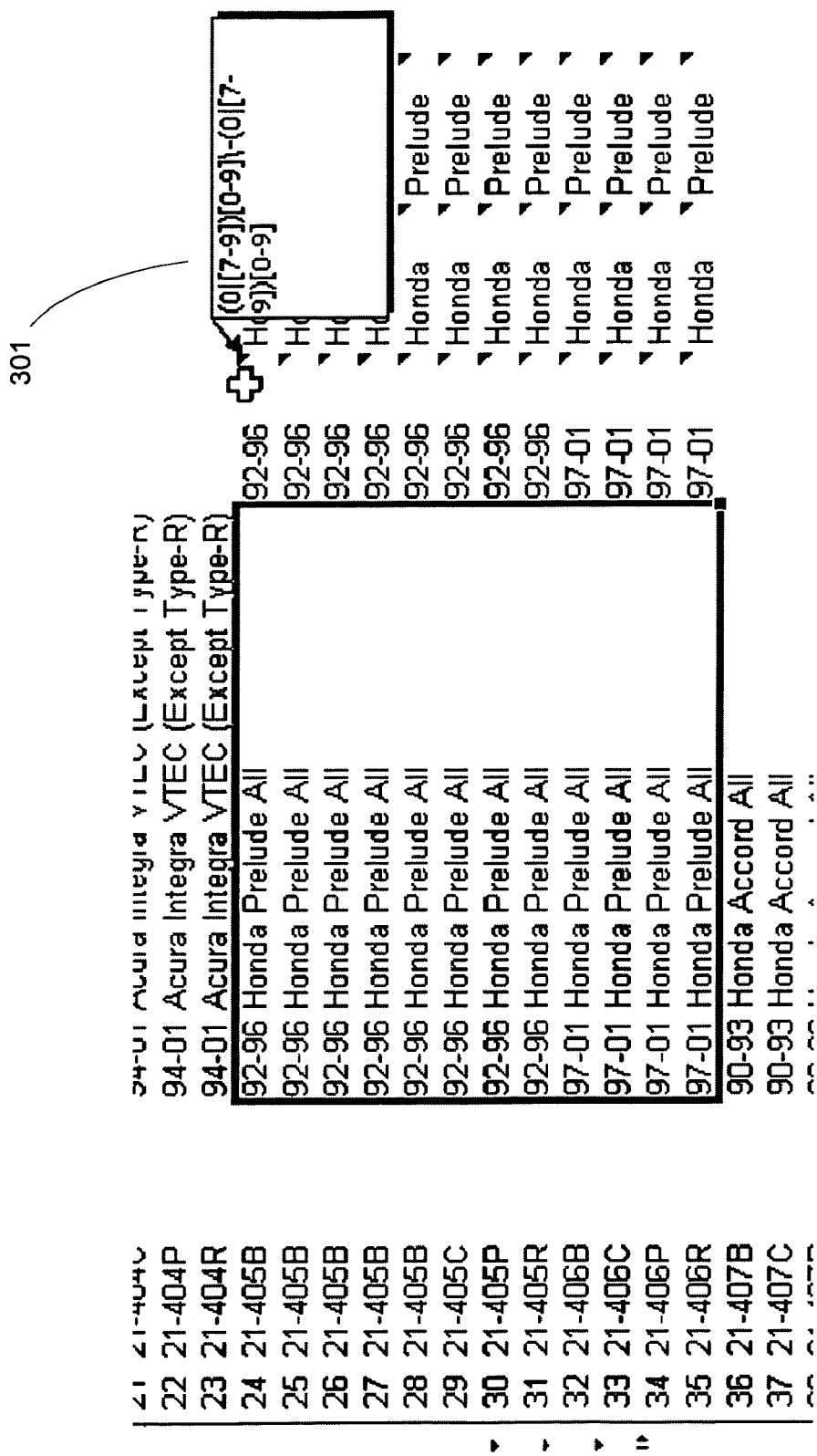
FIG. 3 is a view of a tooltip showing a pattern comprising a regular expression associated with a position when a mouse is held over a particular column.

An apparatus and method for parsing unstructured data will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention enable a user interface for parsing unstructured data using pattern recognition. FIG. 1 is a view of tabular user interface 100 comprising unstructured text shown in unstructured text column 101 and parsed data shown in columns 102 and 103 that matches at least one pattern, while column 104 shows text that currently does not match an existing defined pattern. Arrows showing positions for text that matches a respective pattern are depicted as arcs in the top portion of the figure, however these arrows are for depictive purposes and are not required for use in the invention. The patterns used in parsing data are formed from regular expressions as shown in FIG. 2 below. The parsed data may be displayed in a first format and unmatched strings in the unstructured text may be displayed in a second format. For example, the cell that has a bounding box around it "402 Kentucky Avenue, PO Box 7045, Indianapolis" may be shown as "402 Kentucky Ave[nue], PO Box 7045, [Indianapolis]" for example if the "nue" and city "Indianapolis" are not recognized with the patterns used to parse the data. The use of brackets is exemplary only and the patterns that match may be shown in a different color, bold factor or italic font for example according to the formatting parameters selected. A format may comprise a desired color, font or any other user interface parameter for example such as a separate column associated with a position. In addition, the data that parses according to a pattern may be placed in a column associated with the pattern in a tabular user interface, for example a spreadsheet such as Excel™. Columns 102 and 103 show text that matches respective patterns associated with these positions or columns. By formatting data that successfully parses and displaying data that has not successfully parsed in a different format, the process of readying the data for import into a database is rapidly achieved.

A pattern is also known as a regular expression. A regular expression is an expression that represents a set of strings. For example, the set containing at least three strings apple, apply and application can be described by the pattern "appl[iey].*". The pattern may also be said to match each of the three strings. A set of characters in brackets matches any one of the characters inside the brackets. A period may match any character for example. A quantifier after a character or group specifies how often the preceding expression occurs. The most common quantifiers are ?, *, and +. The question mark indicates there may or may not be one of the previous expression. For example, "labou?r" matches both labor and labour. The asterisk indicates there may be zero or more of the previous expression. For example, "bog*le" matches bole, bogle, boggle, etc. The plus sign indicates that there must be at least 1 of the previous expression. For example, "bog+le" matches bogle, boggle, (but not bole).

FIG. 2 is a view of a tabular user interface 200 comprising a set of patterns comprising associated positions for placing successful pattern matches. The patterns may be created and modified using a tabular user interface although this is not required. Patterns are shown in pattern column 202 and the cell shown with the bounding box around it ".*(Ave|Street . . . " is a regular expression pattern used for associating a portion of unstructured text with a street field or column or position. Any method of associating a pattern with a format such as a position and/or color or font to display text that matches the pattern is in keeping with the spirit of the invention. For example, by utilizing a spreadsheet row that comprises at least a regular expression (for example pattern field 202) and a position field (such as position field 204), any unstructured text string that matches the pattern may be visually displayed in a position that is specified by the position field. In the case of the highlighted pattern, the position is "2", meaning that any text that matches this pattern will be placed in the second column to the right of the unstructured text for example. By allowing for multiple patterns to be defined, multiple matches on a particular unstructured text string may be performed with the respective matching text for each pattern placed into a separate column within the spreadsheet. This further enables the data to be molded into a format that is compatible with a database schema for example. Modification of the patterns allows for more and more of the unstructured text to match the patterns and subsequently eliminates more and more unmatched text. For example by adding a pattern such as "Ind.*" to the list of patterns, then cities such as "Independence" and "Indianapolis" become recognized text and will no longer be displayed in unmatched text column 104 as shown in FIG. 1. When the data has been parsed to the desired level, the data may be exported from the spreadsheet and imported into a database for example.

FIG. 3 is a view of tooltip 301 showing a pattern comprising a regular expression associated with a position when a mouse is held over a particular position or column. The patterns may also be displayed in the tabular user interface in a text field when a cell is selected or as tooltips associated with each position or column where a pattern parses to for example. Displaying the regular expression without requiring the user to switch to another sheet allows for quick view of the regular expression that is being used to parse data for a particular position or column in the spreadsheet for example. By editing the patterns to match more and more of the unstructured text, or by adding new patterns for new fields and positions, the data may be recognized to the desired level.

Figure 4:
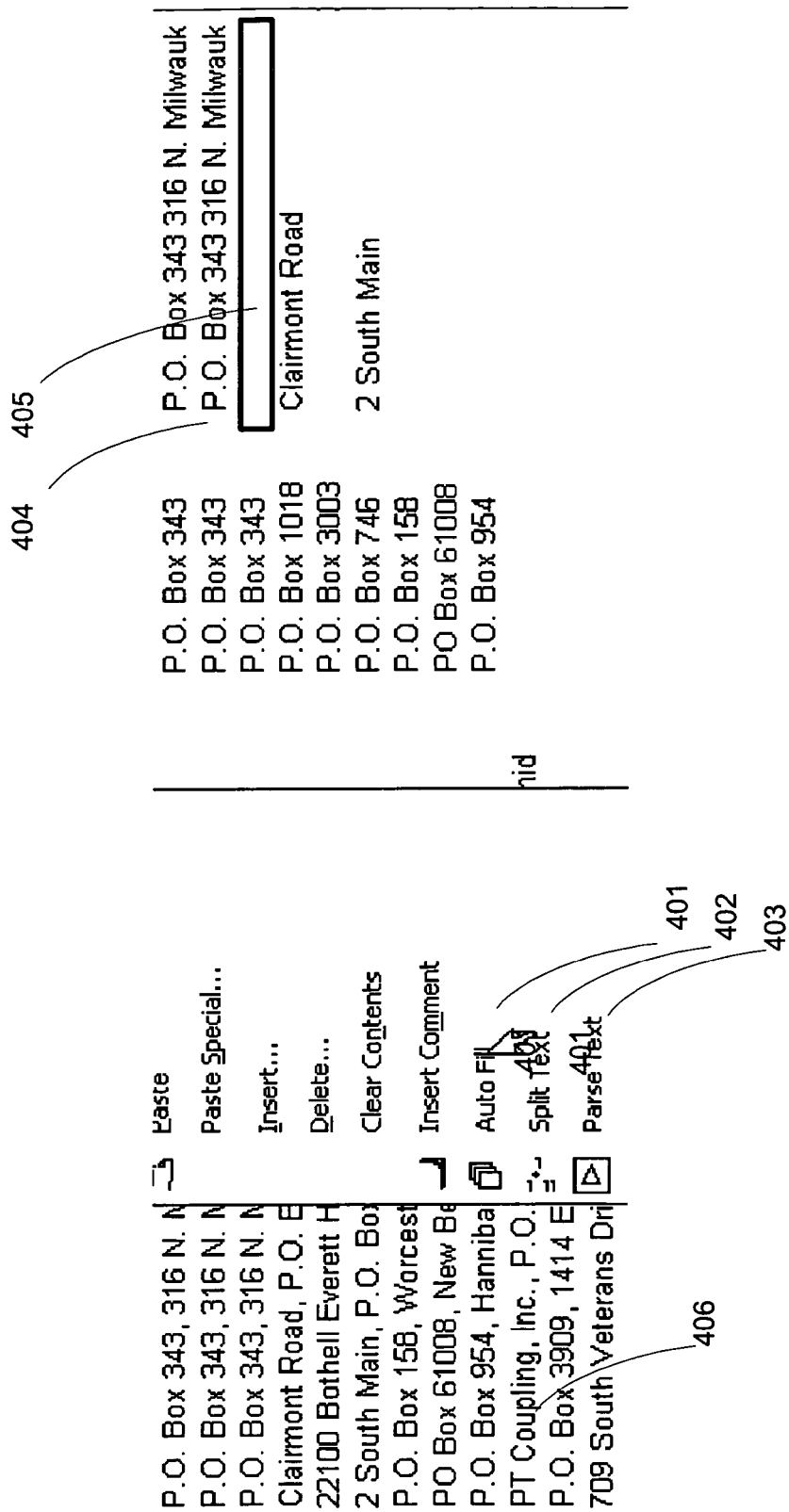
FIG. 4 shows a popup menu presented by an embodiment of the invention allowing for user commands such as parse text, autofill and split-text.

FIG. 4 shows a popup menu presented by an embodiment of the invention allowing for user commands such as autofill command 401, split-text command 402 and parse text command 403. Embodiments of the invention may comprise an "autofill" command that allows cells to be filled from existing selected cells. This feature allows for at least one cell to be copied into another at least one cell anywhere in the spreadsheet by accepting a user command to select at least one cell and accepting a user command to autofill into another selected at least one cell. For example by selecting populated cell 401 and highlighting empty cell 402 and then right clicking the mouse to bring up the popup menu, autofill command 401, split-text command 402 and parse text command 403 are displayed. By selecting autofill, the contents of populated cell 401 are inserted into empty cell 402. This process may utilize the mouse or keyboard commands to accept user commands for example. Although shown for a single cell, multiple cells may be copied into a set of other cells whether empty or not. The split-text command allows for a row to be divided into multiple rows based on a delimiter such as a comma, semicolon, space, tab or any other character. Row 406 for example comprises comma characters and performing a split-text command using this delimiter would split the text into the number of substrings separated by the delimiter character. Accepting the parse data command allows for the number of selected cells to be parsed according to the patterns shown for example in FIG. 2.

Figure 5:
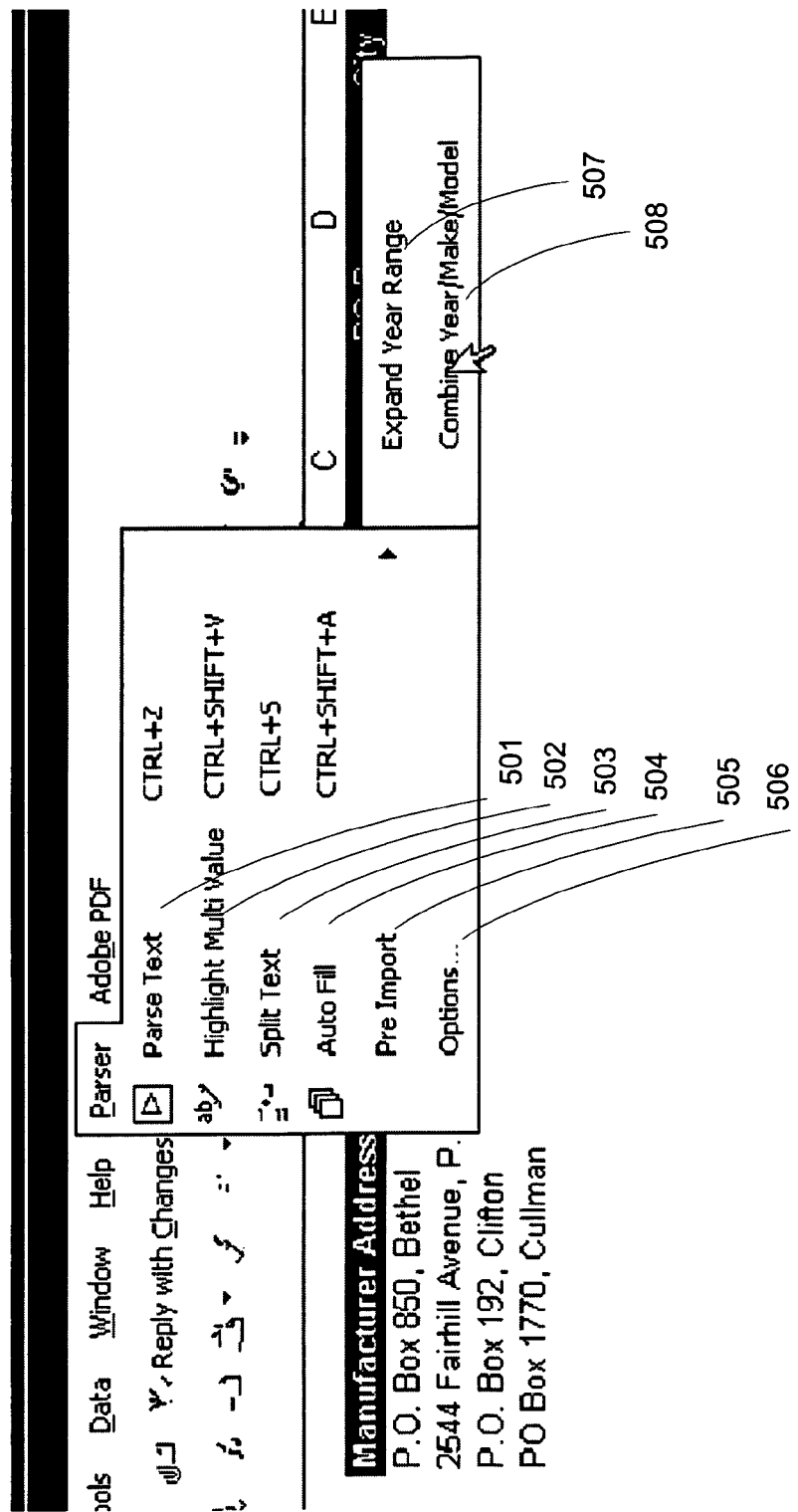
FIG. 5 shows a popup menu presented by an embodiment of the invention allowing for user commands such as parse text, highlight multi value, split text, autofill, pre-import and an options settings interface.

FIG. 5 shows a menu presented by an embodiment of the invention allowing for user commands such as parse text, highlight multi value, split text, autofill, pre-import and an options settings interface. Commands parse text 501, split text 503 and autofull 504 have been discussed in relation to a popup menu shown in FIG. 4. Commands highlight multi value 502, pre-import 505 and options . . . 506 are used to display redundant data, manipulate data before insertion into rows and for setting options respectively. The highlight multi value command may be implemented in a number of ways so long as multi value entries are displayed according in a format associated with multi values. The pre-import command may be utilized in executing any script or other functionality such as splitting a row into multiple rows comprising a single row for each year as per subcommand "expand year range" 507 or multiple rows of unstructured data may be combined into one row using "combine year/make/model" subcommand 508. Any other desired functionality may be inserted into the menu for example by way of scripts or executable source code that is installed into the tabular user interface when the plug-in or add-in is installed. The options . . . command may be used to set options such as reading in at least one pattern definition file, or setting fonts, colors or other visual or operational parameters for example.

Figure 6:
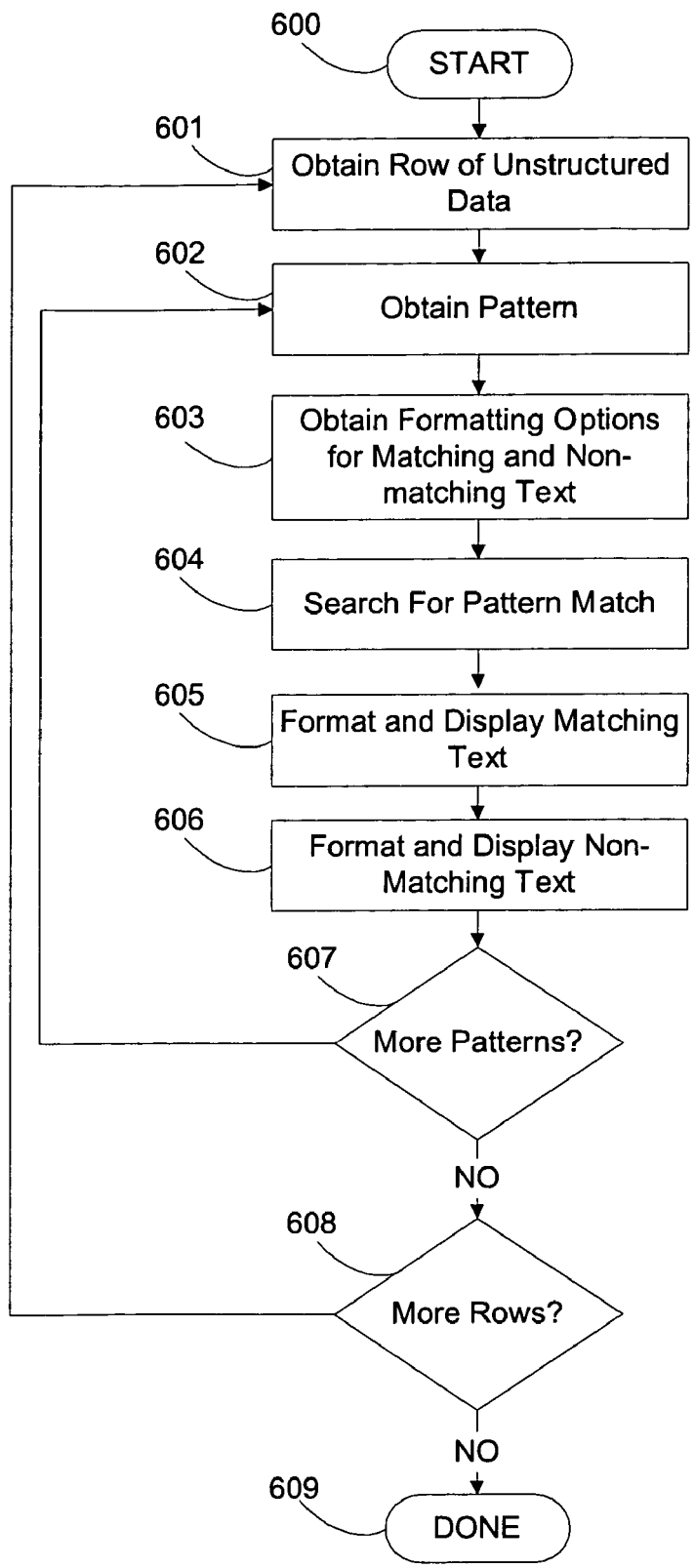
FIG. 6 shows a flowchart detailing operation of an embodiment of a method for parsing unstructured data.

FIG. 6 shows a flowchart detailing operation of an embodiment of a method for parsing unstructured data. An embodiment of a method for parsing unstructured data comprises obtaining a row of unstructured data at 601. A pattern is obtained at 602. The pattern may be any regular expression of any complexity. The formatting information associated with the pattern is obtained at 603. The formatting information may comprise color, font and/or position information. The position information for example may specify an absolute or relative position for which to place data that matches the pattern. The row of unstructured text is searched at 604. Text that successfully matches the pattern is formatted according to the formatting associated with matching text at 605. This for example may involve coloring the text in the unstructured text column (see FIG. 1) with color showing those substring(s) that yield pattern matches. The matching data may also be placed in a separate column according to the position value (see FIG. 2) and also formatted with color or bold or other visual indication as desired. The non-matching text may be formatted as such, e.g., optionally colored and placed into a separate column according to a non-matching position that may be absolute or relative to the column/cell being parsed and displayed at 606. The method may then check for more existing patterns at 607 and if there are more, branch to 602. If there are no more patterns to check for the given row then a check for more unstructured text rows is performed at 608. Checking for more regular expressions to match and checking for more rows to match allows for all text to be check with all patterns. There is no limit to the number of patterns or rows that may be checked using embodiments of the invention. When there are no more unstructured text rows or more patterns to search with processing completes at 609.

Unstructured data may be imported from a variety of sources. After the data has parsed to the desired level, the resulting normalized data may then be exported from the tabular user interface and imported into a database. An advantage of this solution is that it is not bound to specific business logic and may be utilized for data originating from and destined for varying verticals.

While the invention herein disclosed has been described by means of specific embodiments and applications thereof, numerous modifications and variations could be made thereto by those skilled in the art without departing from the scope of the invention set forth in the claims.

What is claimed is:

1. A computer implemented method for parsing unstructured data comprising:
providing a user interface configured to accept in a first column a plurality of patterns to apply to unstructured text, wherein said user interface is further configured to accept a plurality of column names in a second column, wherein each of said plurality of patterns is associated with a column name from said plurality of column names;

obtaining user input from said user interface comprising said plurality of patterns and said plurality of column names;

obtaining at least one row of unstructured data;

searching said at least one row of unstructured data for said plurality of patterns to determine matching text for each of said plurality of patterns and to determine unmatched text;

obtaining a first display format parameter for said matching text and a second display format parameter, different from said first display format parameter, for said unmatched text;

formatting at least one text substring of said at least one row of unstructured data according to said first display format parameter in response to said at least one text substring matching at least one of said plurality of patterns;

formatting at least one unmatching text substring according to said second display format parameter in response to said at least one unmatching text substring not matching any of said plurality of patterns;

displaying said at least one row of unstructured data at least one row of unstructured data after said formatting in a first display column;

displaying said unmatched text in a second display column; and displaying said matching text in a plurality of matching display columns, wherein each matching display column comprises text matching a selected pattern, wherein a displayed title for said each matching display column comprises a selected column name associated with said selected pattern.

2. The method of claim 1 further comprising:

displaying at least one character in said first display column in a format indicating that at least a portion of said at least one unstructured text record has not matched at least one of said plurality of patterns.

3. The method of claim 1 wherein said first display format comprises a color value.

4. The method of claim 1 wherein said second display format comprises a color value.

5. The method of claim 1 further comprising:

displaying a tooltip comprising said pattern when a mouse is over a matching display column associated with said pattern.

6. An apparatus for parsing unstructured data comprising:

a computer; and a computer readable medium coupled with said computer wherein said computer readable medium is configured to store computer-executable process steps said process steps are configured for parsing and displaying results of said parsing in a tabular user interface, and said process steps comprise:

code configured to provide a user interface configured to accept in a first column a plurality of patterns to apply to unstructured text, wherein said user interface is further configured to accept a plurality of column names in a second column, wherein each of said plurality of patterns is associated with a column name from said plurality of column names;

code configured to obtain user input from said user interface comprising said plurality of patterns and said plurality of column names;

code configured to obtain at least one row of unstructured data;

code configured to search said at least one row of unstructured data for said plurality of patterns to determine matching text for each of said plurality of patterns and to determine unmatched text;

code configured to obtain a first display format parameter for said matching text and a second display format parameter, different from said first display format parameter, for said unmatched text;

code configured to format at least one text substring of said at least one row of unstructured data according to said first display format parameter in response to said at least one text substring matching at least one of said plurality of patterns;

code configured to format at least one unmatching text substring according to said second display format parameter in response to said at least one unmatching text substring not matching any of said plurality of patterns, code configured to display said at least one row of unstructured data after formatting in a first display column;

code configured to display said unmatched text in a second display column; and code configured to display said matching text in a plurality of matching display columns, wherein each matching display column comprises text matching a selected pattern, wherein a displayed title for said each matching display column comprises a selected column name associated with said selected pattern.

7. The apparatus of claim 6 further comprising:

code configured to display at least one character in said first display column in a format indicating that at least a portion of said at least one unstructured text record has not matched at least one of said plurality of patterns.

8. The apparatus of claim 6 wherein said first display format comprises a color value.

9. The apparatus of claim 6 wherein said second display format comprises a color value.

10. The apparatus of claim 6 further comprising:

code configured to display a tooltip comprising said pattern when a mouse is over a matching display column associated with said pattern.

11. The method of claim 6 further comprising:

editing at least one pattern or creating at least one additional pattern to recognize the searched data to a desired level.

12. The apparatus of claim 1 further comprising:

code configured to edit at least one pattern or to create at least one additional pattern to recognize the searched data to a desired level;

code configured to format a second text string according to said second display format parameter in response to said second text string not matching said pattern wherein said second text string is selected from said at least one unstructured text record;

code configured to check for an additional pattern; and code configured to check for more unstructured text records to match with said additional pattern.

* * * * *